US008070576B2

(12) United States Patent
Bennett et al.

(10) Patent No.: US 8,070,576 B2
(45) Date of Patent: Dec. 6, 2011

(54) GAMING MACHINE WITH BANK CREDIT METER

(75) Inventors: Nicholas Luke Bennett, Lane Cove (AU); Natalie Bryant, Lane Cove (AU); Peter Stathis, Castle Hill (AU)

(73) Assignee: Aristocrat Technologies Australia Pty Ltd. (AU)

( * ) Notice: Subject to any disclaimer, the term of this patent is extended or adjusted under 35 U.S.C. 154(b) by 1134 days.

(21) Appl. No.: 10/204,074

(22) PCT Filed: Feb. 23, 2001

(86) PCT No.: PCT/AU01/00188
§ 371 (c)(1), (2), (4) Date: Oct. 10, 2002

(87) PCT Pub. No.: WO01/70355
PCT Pub. Date: Sep. 27, 2001

(65) Prior Publication Data

US 2003/0092483 A1 May 15, 2003

(30) Foreign Application Priority Data

Mar. 17, 2000 (AU) .................................... PQ6297

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/16

(58) Field of Classification Search .................. 463/1–9, 463/11–28, 40–42, 30; 273/292
See application file for complete search history.

(56) References Cited

U.S. PATENT DOCUMENTS 5,275,400 A * 1/1994 Weingardt et al. .............. 463/12
(Continued)

FOREIGN PATENT DOCUMENTS

EP 0 373 801 A2 6/1990
(Continued)

OTHER PUBLICATIONS

Wagner, Dan. Human Factors Design Guide (Springfield, Virginia, 1996), pp. 8-1 & 8-4.*

(Continued)

*Primary Examiner* — David L Lewis
*Assistant Examiner* — Reginald Renwick
(74) *Attorney, Agent, or Firm* — McAndrews, Held & Malloy, Ltd.

(57) ABSTRACT

A gaining machine (10) has a display (14) and a game controller arranged to control images displayed on the display (14). The game controller is arranged to play a game wherein one or more random events are caused to be displayed on the display (14) and, if a predefined winning event results, the machine (10) awards a prize which is credited to a credit meter of the machine (10). The credit meter includes two meter displays, a first meter display (42.1) indicating credit which is available for expenditure in the machine (10) to play at least one game and a second meter display (42.2) indicating credit set aside by at least one of a player and the game controller and which credit is unavailable to the player for wagering on a game but which is only available by termination of a playing session.

20 Claims, 10 Drawing Sheets

U.S. PATENT DOCUMENTS

| | | | | | |
|---|---|---|---|---|---|
| 5,277,424 | A * | 1/1994 | Wilms | 463/12 |
| 5,470,079 | A * | 11/1995 | LeStrange et al. | 463/25 |
| 5,511,781 | A * | 4/1996 | Wood et al. | 463/13 |
| 5,539,450 | A * | 7/1996 | Handelman | 725/1 |
| 5,603,659 | A | 2/1997 | Okada | |
| 5,779,547 | A * | 7/1998 | SoRelle et al. | 463/28 |
| 5,882,259 | A * | 3/1999 | Holmes, Jr. et al. | 463/13 |
| 5,967,894 | A * | 10/1999 | Kinoshita et al. | 463/13 |
| 5,967,896 | A * | 10/1999 | Jorasch et al. | 463/25 |
| 6,062,981 | A * | 5/2000 | Luciano, Jr. | 463/26 |
| 6,089,979 | A * | 7/2000 | Klein | 463/25 |
| 6,159,098 | A * | 12/2000 | Slomiany et al. | 463/25 |
| 6,168,522 | B1 * | 1/2001 | Walker et al. | 463/25 |
| 6,322,445 | B1 * | 11/2001 | Miller | 463/13 |
| 6,379,248 | B1 * | 4/2002 | Jorasch et al. | 463/25 |
| 6,508,709 | B1 * | 1/2003 | Karmarkar | 463/42 |
| 6,511,377 | B1 * | 1/2003 | Weiss | 463/25 |
| 6,547,131 | B1 * | 4/2003 | Foodman et al. | 235/380 |
| 6,607,441 | B1 * | 8/2003 | Acres | 463/25 |
| 6,629,890 | B2 * | 10/2003 | Johnson | 463/25 |
| 2001/0031663 | A1 * | 10/2001 | Johnson | 463/42 |
| 2002/0002075 | A1 * | 1/2002 | Rowe | 463/25 |
| 2002/0142844 | A1 * | 10/2002 | Kerr | 463/42 |

FOREIGN PATENT DOCUMENTS

EP 000448013 A2 * 9/1991

OTHER PUBLICATIONS

International Search Report, PCT/AU 01/00188 mailed Apr. 19, 2001.

* cited by examiner

GAMING MACHINE WITH BANK CREDIT METER

FIELD OF THE INVENTION

This invention relates to a gaming machine. More particularly, the invention relates to a gaming machine and to an improved meter arrangement for such a gaming machine.

BACKGROUND TO THE INVENTION

Gaming machines are becoming increasingly popular. In certain quarters, concerns are being expressed about the expenditure of funds on gaming machines.

SUMMARY OF THE INVENTION

According to the invention there is provided a gaming machine having a display means and a game control means arranged to control images displayed on the display means, the game control means being arranged to play a game wherein one or more random events are caused to be displayed on the display means and, if a predefined winning event results, the machine awards a prize which is credited to a credit meter of the machine, the gaming machine being characterized in that the credit meter includes two meter displays, a first meter display indicating credit which is available for expenditure in the machine to play at least one game and a second meter display indicating credit set aside by at least one of a player and the game control means and which credit is unavailable to the player for wagering on a game but which is only available by termination of a playing session.

For the sake of explanation, the second meter display will be referred to as a bank credit meter or, more simply, as a bank meter. Credit displayed on the bank meter can never be used for making wagers but can only be collected from the gaming machine upon termination of a playing session.

In one aspect, the game control means may credit excess credit to the bank meter where the player tenders credit and only a part of the tendered credit is to be used for wagering by the player. The crediting of excess credit to the bank meter may be made at the selection of the player or may be forced by the game control means of the gaining machine.

Thus, in one embodiment of this aspect of the invention, the gaming machine may include a transfer device for transferring excess credit to the bank meter. The transfer device may be a "bank" button to transfer credit from the credit meter to the bank meter. Hence, for example, should a player wish to gamble with less than an amount of money that the player has inserted into the machine, the player can transfer a portion of these funds via the bank button to the bank meter.

In another embodiment of this aspect of the invention, the game control means may automatically transfer excess credit, beyond a predetermined threshold as contained in the game control means, to the bank meter without player intervention.

In another aspect of the invention, the game control means may credit wins from games played to the bank meter instead of the first meter display, which is the normal credit meter. This may be referred to as an autobank mode.

Further, the game control means may credit wins to the bank meter automatically or at the option of the player. In the latter case, the player may be able to set a limit above which wins are credited to the bank meter and below which wins are credited to the first meter display. The limit may be set via an appropriate setting device operated by the player. The setting device may be an autobank button which is toggled by the player to set the limit.

In use, when the player activates the autobank button to bank the player's wins, any wins resulting are automatically credited to the bank meter rather than to the credit meter. Funds credited to the bank meter are then only available to the player upon termination of a gaming session. A gaming session may be regarded as having terminated either when the credit on the credit meter is zero or when the player has cashed out credit displayed on the first meter display resulting in a zero balance on the first meter display. Thereafter, any credits remaining in the bank meter may be cashed out.

The gaming machine may include a discernible warning device to warn a player, upon termination of a gaming session, to cash out from the bank meter. The discernible warning device may be an audible and/or a visual warning device. The player may be unable to cancel the discernible warning device by entering more credit into the gaming machine. In other words, the credit standing to the player in the bank meter must be collected by the player before the gaming machine can accept more credit.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
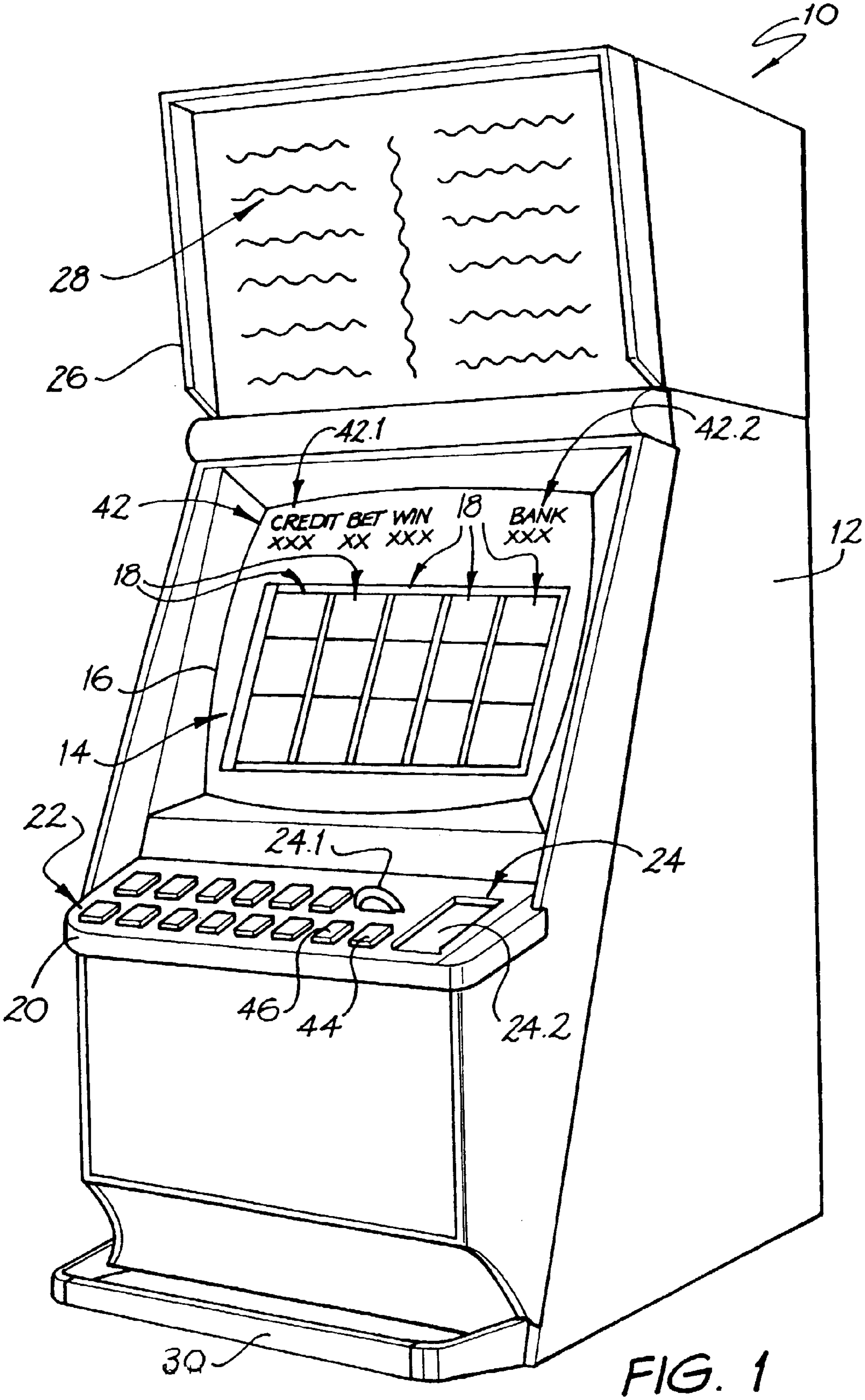
FIG. 1 shows a three dimensional view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. It will, however, be appreciated that the invention applies to other games as well such as card games, ball-type games like keno, or the like. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
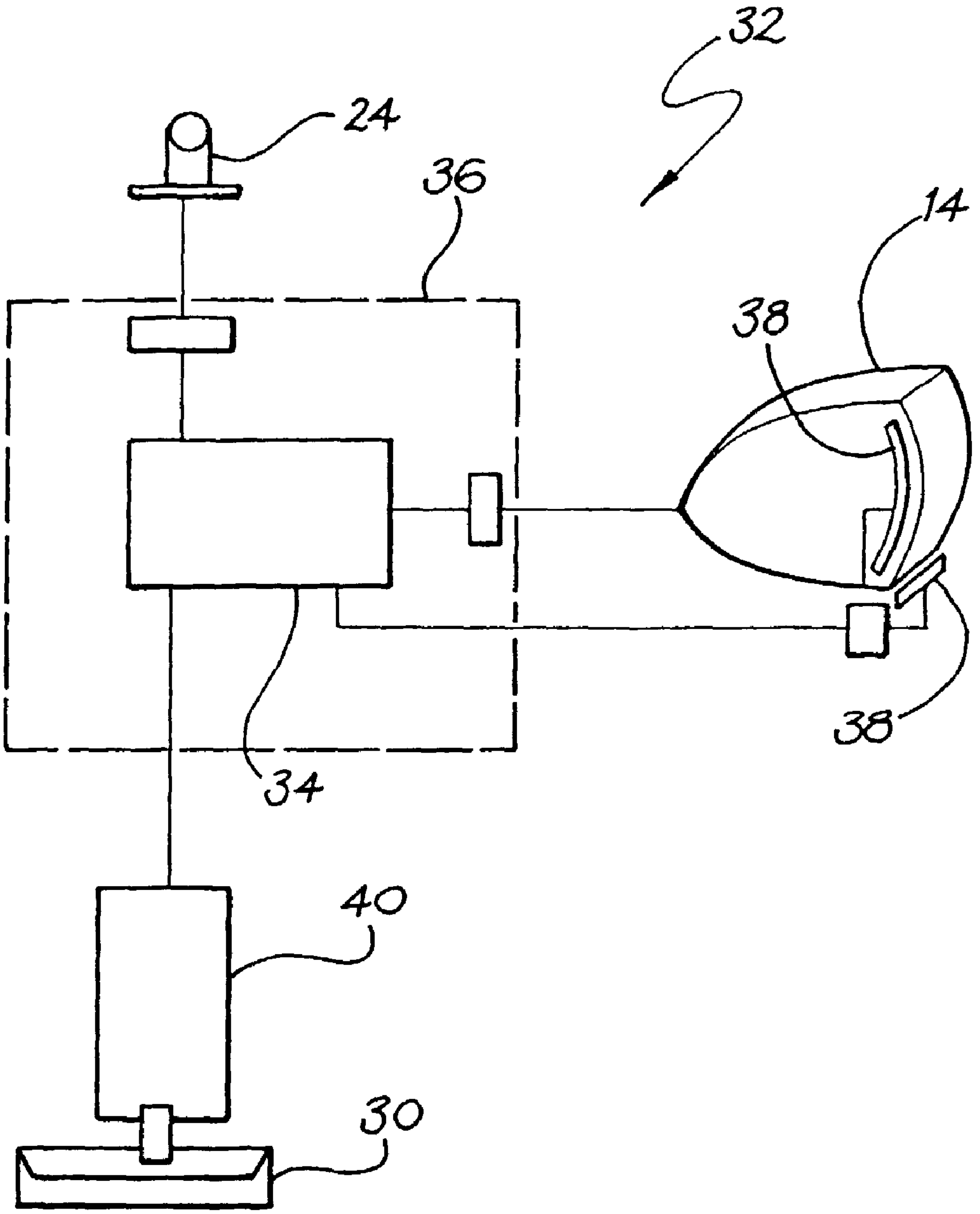
FIG. 2 shows a schematic block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen. The controller 36 also receives input pulses from the mechanism 24 indicating that a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit standing to a credit meter 42.1 and/or to a bank meter 42.2 of a credit meter display 42 of the gaming machine 10 as will be described in greater detail below.

In this invention, the credit meter display 42 of the gaming machine 10 is displayed on the screen of the video display unit 14. The credit meter display 42 has two components, the standard credit meter 42.1 and the bank meter 42.2 which constitute separate displays on the screen of the video display unit 14.

Also, a "bank" button 44 is arranged on the midtrim 20 of the gaming machine 10. Still further, an "autobank" button 46 is also arranged on the midtrim 20 of the machine 10. It will be appreciated that, instead of the buttons 44 and 46, these features may be implemented as touch screen features on the screen of the video display unit 14.

The purpose of the split credit meter 42 is to encourage responsible gaming. The bank meter 42.2 gives the player the option to bank any portion of the player's winnings or wagers. Money available on the credit meter 42.1 of the credit meter display 42 may be wagered in the normal way but that money credited to the bank meter 42.2 can never be wagered from the bank meter 42.2 but can only be collected from the gaming machine 10 by cashing out.

Two scenarios are envisaged where the bank meter 42.2 will mostly be used. These scenarios are, firstly, where the player uses a large denomination note or coin but only wishes to use a portion of the money credited to the machine. The second scenario is where a win is paid to the bank meter 42.2 instead of to the credit meter 42.1.

By means of the bank button 44 (or its touch screen equivalent) the player can transfer money from the credit meter 42.1 to the bank meter 42.2.

Thus, when a player inserts cash into the machine this will be displayed on the credit meter 42.1 in the conventional fashion. Whenever the gaming machine 10 is in idle mode (which includes immediately after credit is inserted into the game machine) the player will be able to press the bank button 44 to transfer credit from the credit meter 42.1 to the bank meter 42.2. The preferred embodiment is for the bank button 44 to work as a toggle transferring credits of predetermined amounts from the credit meter 42.1 to the credit meter 42.2 each time the button 44 is activated.

The size of the amount which is transferred each time the button 44 is activated may be operator selectable and may also be dependent upon the denomination of the gaming machine 10. Hence, a player may insert fifty dollars into the gaming machine with the intention of betting no more than twenty dollars. The credit transfer amount applicable to the gaming machine 10 when the button 44 is manipulated may be five dollars. Hence, by pressing the bank button 44 six times, thirty dollars is transferred to the bank meter 42.2 from the credit meter 42.1. Only twenty dollars remains on the credit meter 42.1 with which the player can bet. Once the twenty dollars has been depleted, assuming winnings are credited to the bank meter 42.2, the credit meter 42.1 will have been depleted and a warning message and sound will occur reminding the player to collect the banked credits, as displayed on the bank meter 42.2, before leaving the machine 10. The sound and message will be cancelled by pressing the "Collect" button of the machine 10 resulting in all credits credited to the bank meter 42.2, including the original thirty dollars, being paid out to the player in the applicable fashion. It is preferred that the player will not be able to cancel the warning message and sound by inserting more credit into the gaming machine 10. In other words, the bank meter 42.2 must be cleared by being collected before the gaming machine 10 will be able to accept more credit.

The bank button 44 may be operable at any time when the gaming machine 10 is in an idle mode. Hence, after a win has been transferred to the credit meter display 42, whether to the credit meter 42.1 or to the bank meter 42.2, the player may again decide to move some or all of the current credit on the credit meter 42.1 to the bank meter 42.2. This is done by appropriation manipulation of the bank button 44.

In another embodiment of this scenario or aspect of the invention, the gaming machine 10 selects a maximum amount of money that can be credited to the credit meter 42.1 at any one time. For example, the machine 10 may set a maximum limit of twenty dollars to appear on the credit meter 42.1 at any one time. As a result, if a player inserts more than the maximum allowable amount, the credit meter 42.1 is credited with whatever part of the entered amount is required to take the credit meter 42.1 to its maximum amount. The balance is transferred by the machine to the bank meter 42.2. Assuming the player inserts fifty dollars and the balance on the credit meter had been zero, then, if the maximum permissible amount which can be displayed on the credit meter 42.1 is twenty dollars, the balance of thirty dollars will be transferred to the bank meter 42.2 by the machine 10. In this embodiment, it also envisaged that all winnings will be transferred directly to the bank meter 42.2 automatically and without any player intervention. Hence, the bank button 44 may be eliminated.

It is also preferred that all winnings are banked to the bank meter 42.2 rather than to the credit meter 42.1 but this will be at the option of the player.

In one embodiment, the machine 10 includes the autobank button 48 or its touch screen equivalent. When the autobank button 48 is activated, any wins payable to the player 42.2 as a result of playing the game 16 will be credited to the bank meter 42.2 rather than to the credit meter 42.1. Thus, the player can only access the winnings by terminating a gaming session on the gaming machine 10 and collecting the funds in the applicable fashion.

The autobank button 48 may also be applicable together with a limit. Whenever the player toggles the button 48, from an "off" to an "on" state, they will be able to define the limit. Then, when any win equals or exceeds the set limit, this win is transferred to the bank meter 42.2. Any wins lower than the limit are transferred to the credit meter 42.1.

Still further, instead of the button 48, whenever a win occurs, the standard "play on, gamble or take win" message will be augmented by a "bank" message. If the player then presses the bank button 44 at this point, the win just obtained will be transferred to the bank meter 42.2 rather than to the credit meter 42.1.

The banking feature may be provided in combination with other features of the gaming machine 10. Hence, for example, a spin/bank button (or similar) could be provided which automatically banks all wins in combination with the other feature. Hence, if a player wishes to alter their bet or have wins transferred to the credit meter 42.1 the player will press the standard play line button (or whichever applicable button) to commence games as per normal operation of the machine 10. By pressing the spin/bank button (not shown) a game will commence at the current bet per line and the previous game's number of lines. Any wins resulting from playing the machine 10 will automatically be credited to the bank meter 42.2.

Referring now to FIGS. 3*a* to 3*j* of the drawings, examples of the invention are illustrated.

Figure 3A:
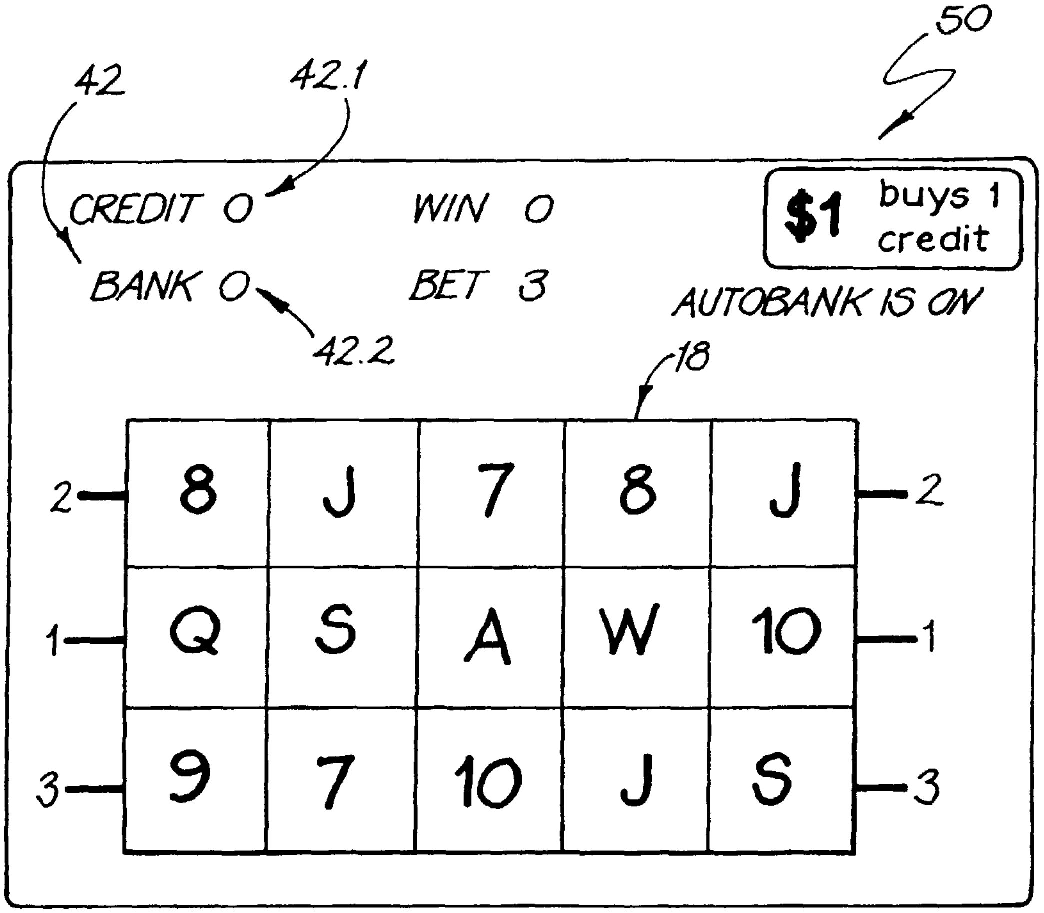
FIGS. 3*a* to 3*j* show screen displays of various examples of the invention.

Prior to commencement of the game, a screen display on the video display unit 14 of the machine is shown at 50 in FIG. 3*a*. The credit meter 42.1 and the bank meter 42.2 are both set at zero.

Figure 3B:
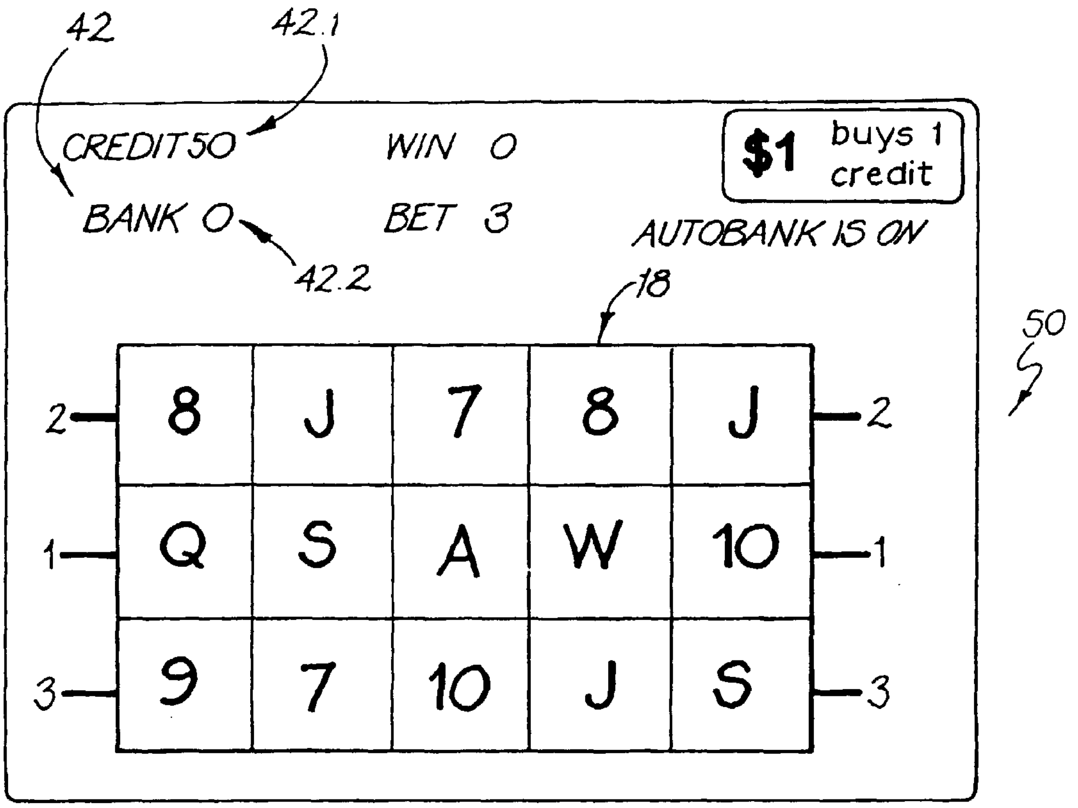
Figure 3C:
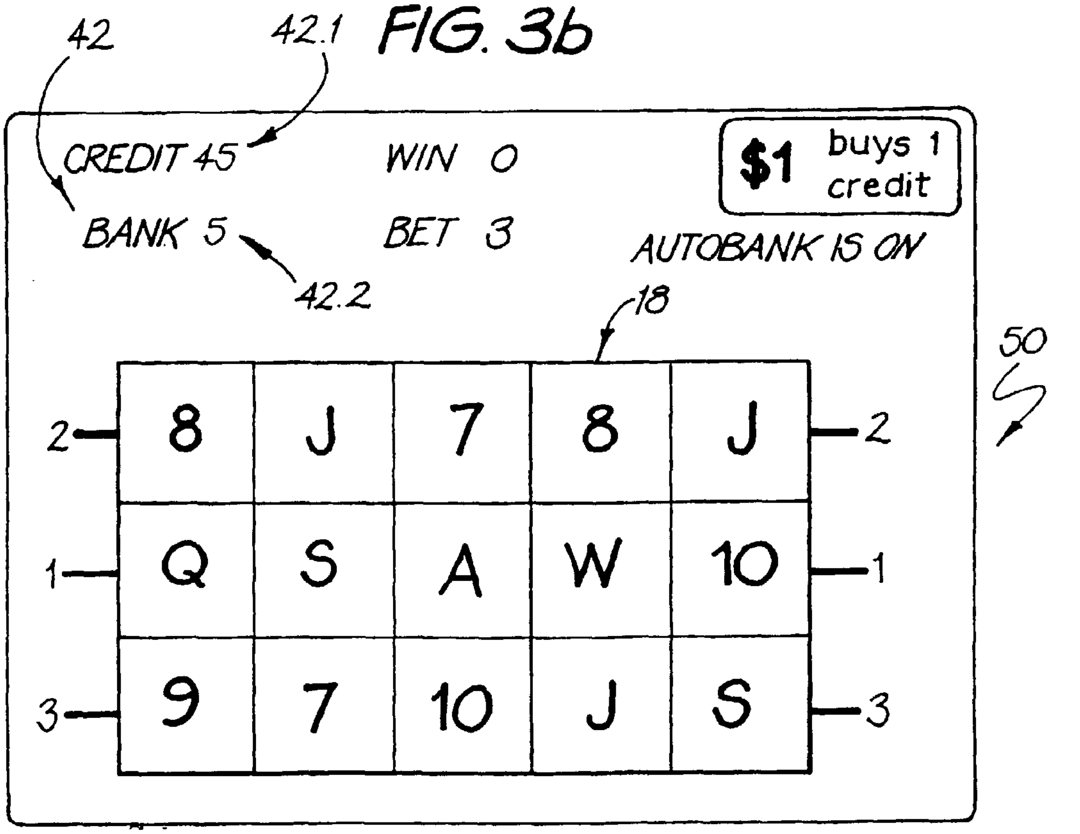

A player inserts a fifty dollar note via the bill acceptor 24.2. This is monitored by the mechanism 24 and the processor 32 and the credit meter 42.1 is credited as shown in FIG. 3*b* of the drawings.

Figure 3D:
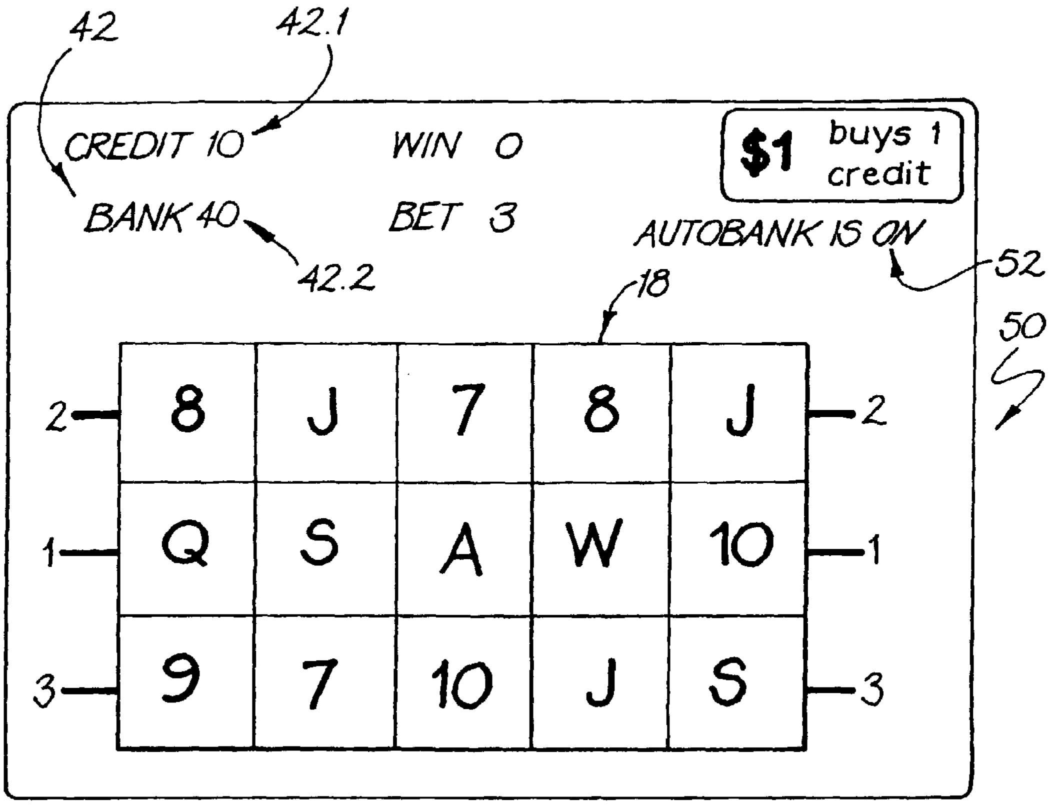
Figure 3E:
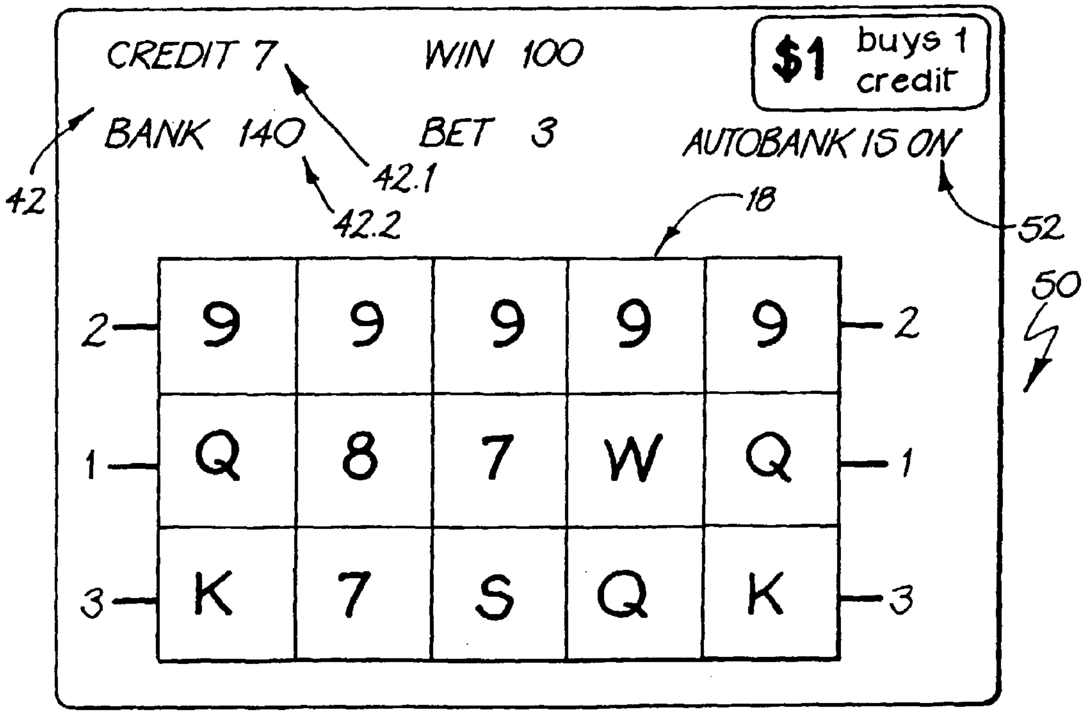

The player only wishes to bet ten dollars of the fifty dollars credited so the player presses the bank button 44 eight times. As shown, after the first press of the button 44 in FIG. 3*c* of the drawings, each time the button 44 is pressed, five dollars are transferred from the credit meter 42.1 to the bank meter 42.2 until forty dollars has been credited to the bank meter 42.2 and only an amount of ten dollars remains on the credit meter 42.1 as illustrated in FIG. 3*d* of the drawings.

The player then bets one credit per line on all three paylines. As a result of achieving five nines on payline two, a win of one hundred credits results. Due to the fact that the autobank button 46 is on, as illustrated by a message 52 on the screen 50, the one hundred credits for the win are credited to the bank meter 42.2.

Figure 3F:
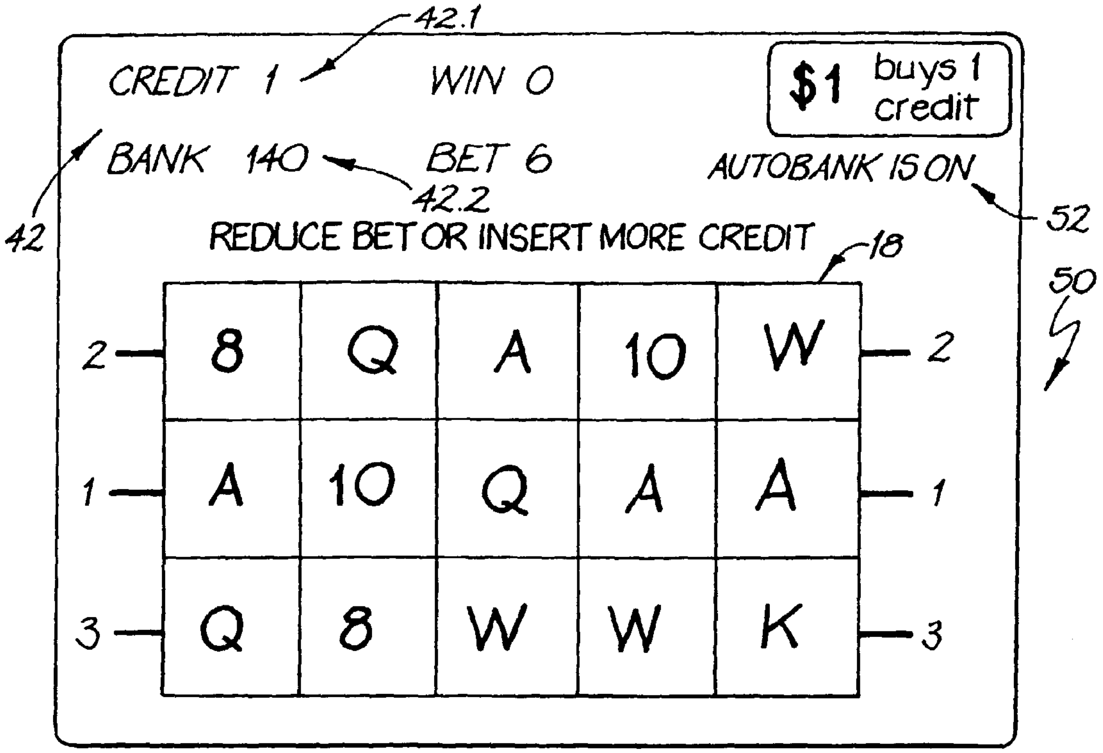
Figure 3G:
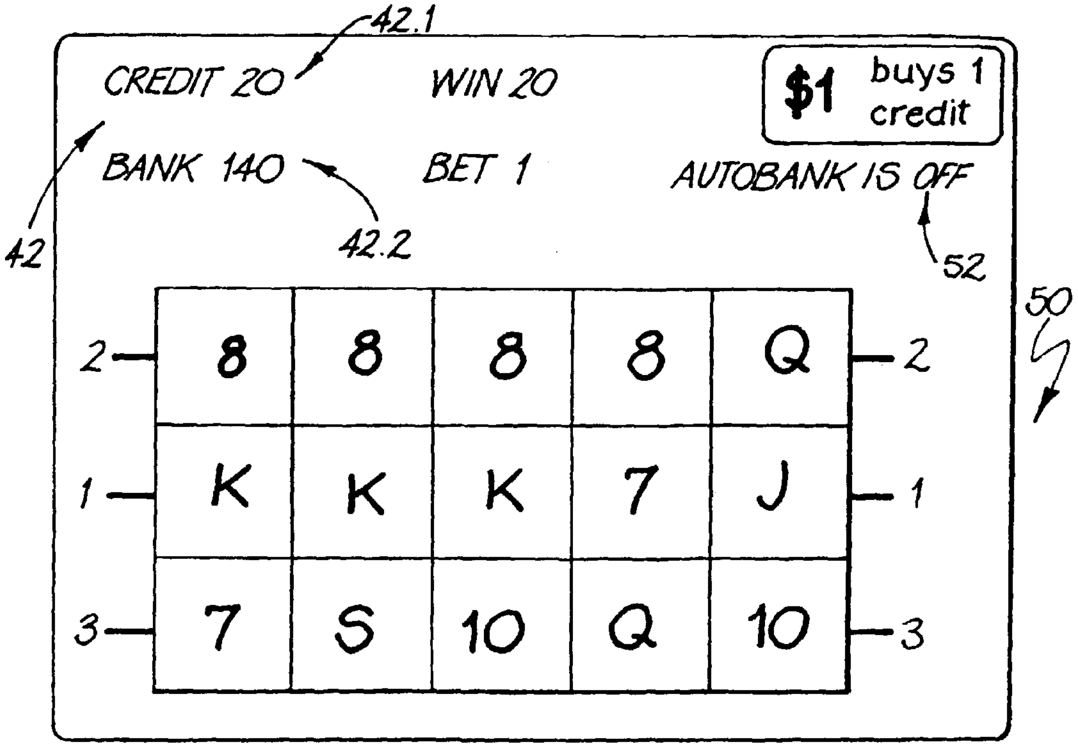
Figure 3H:
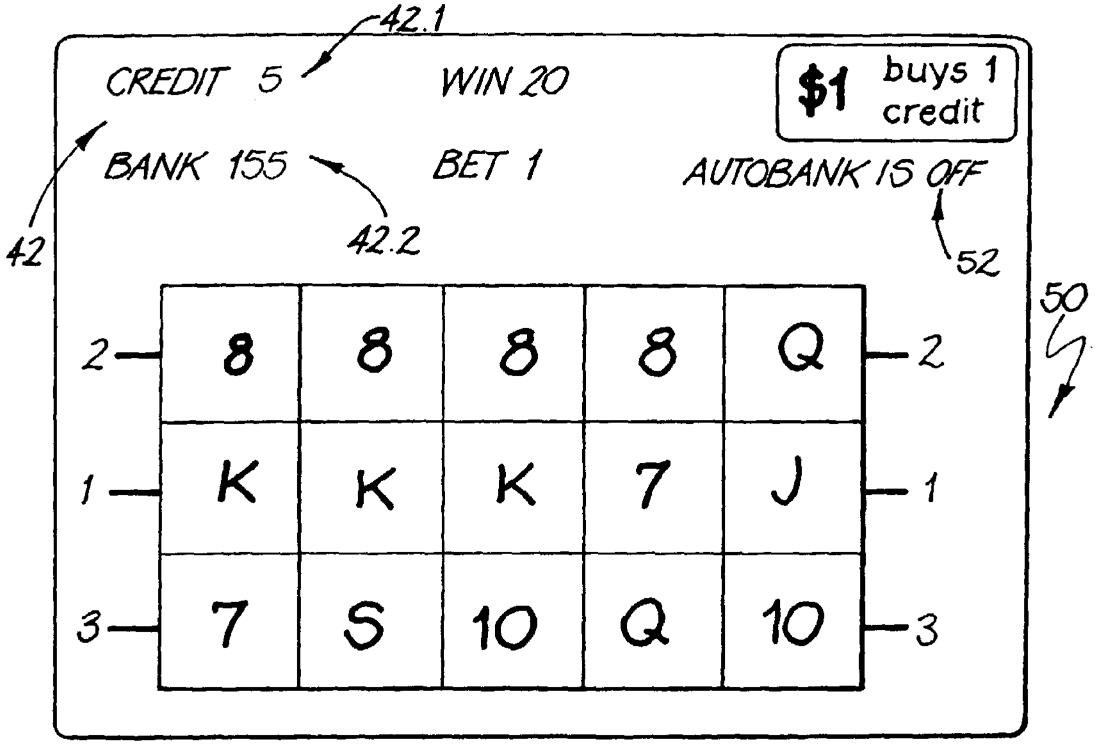
Figure 3I:
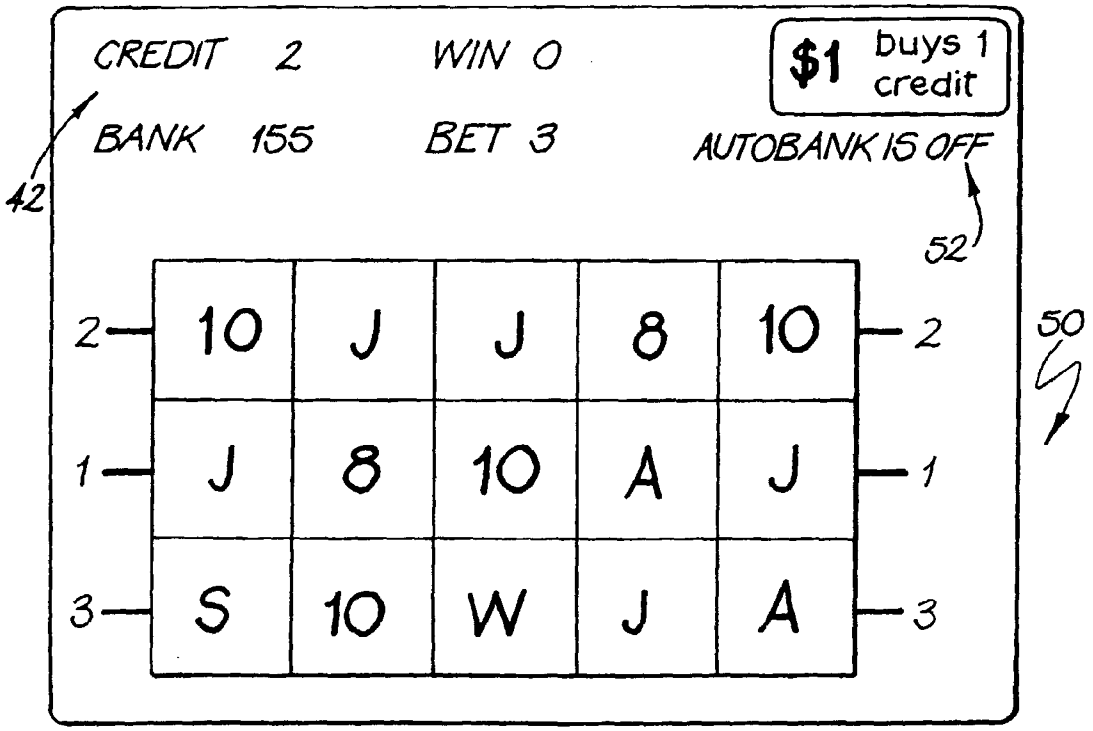
Figure 3J:
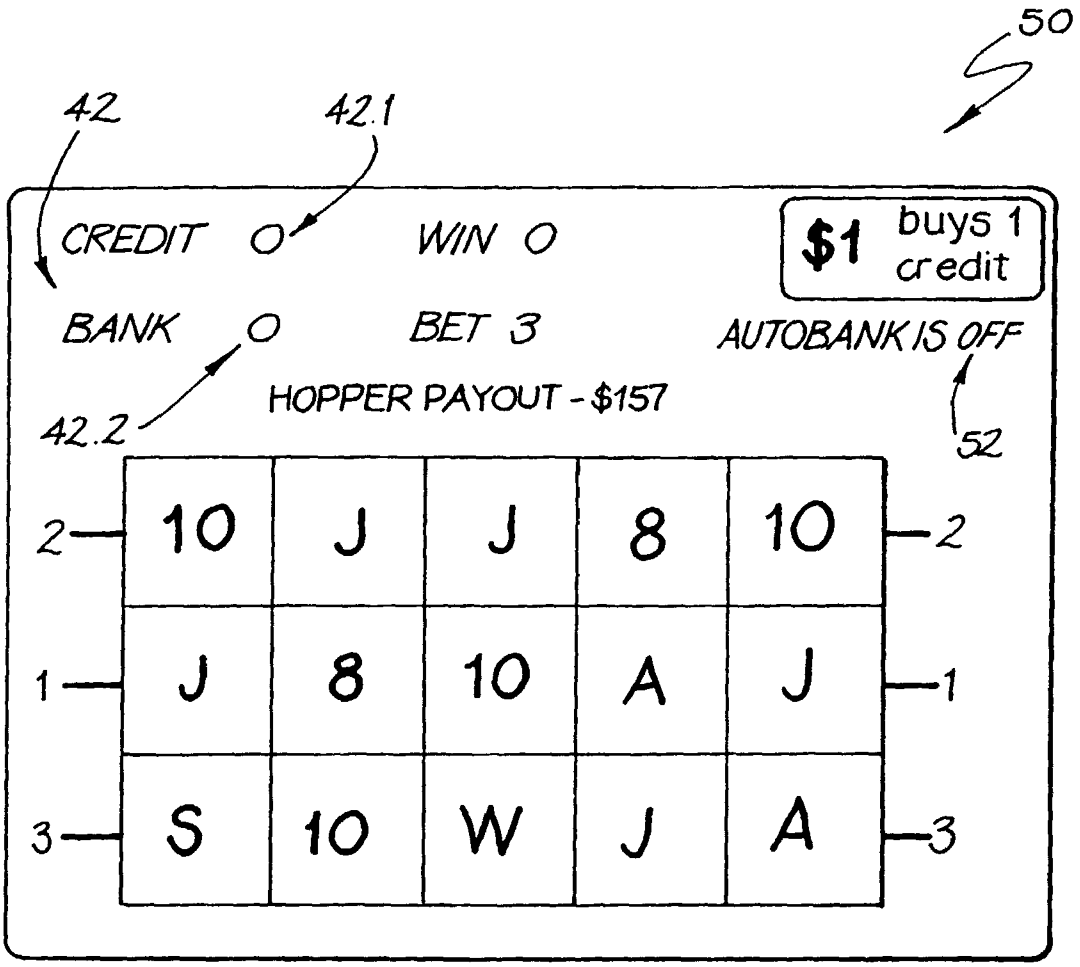
Figure 4:
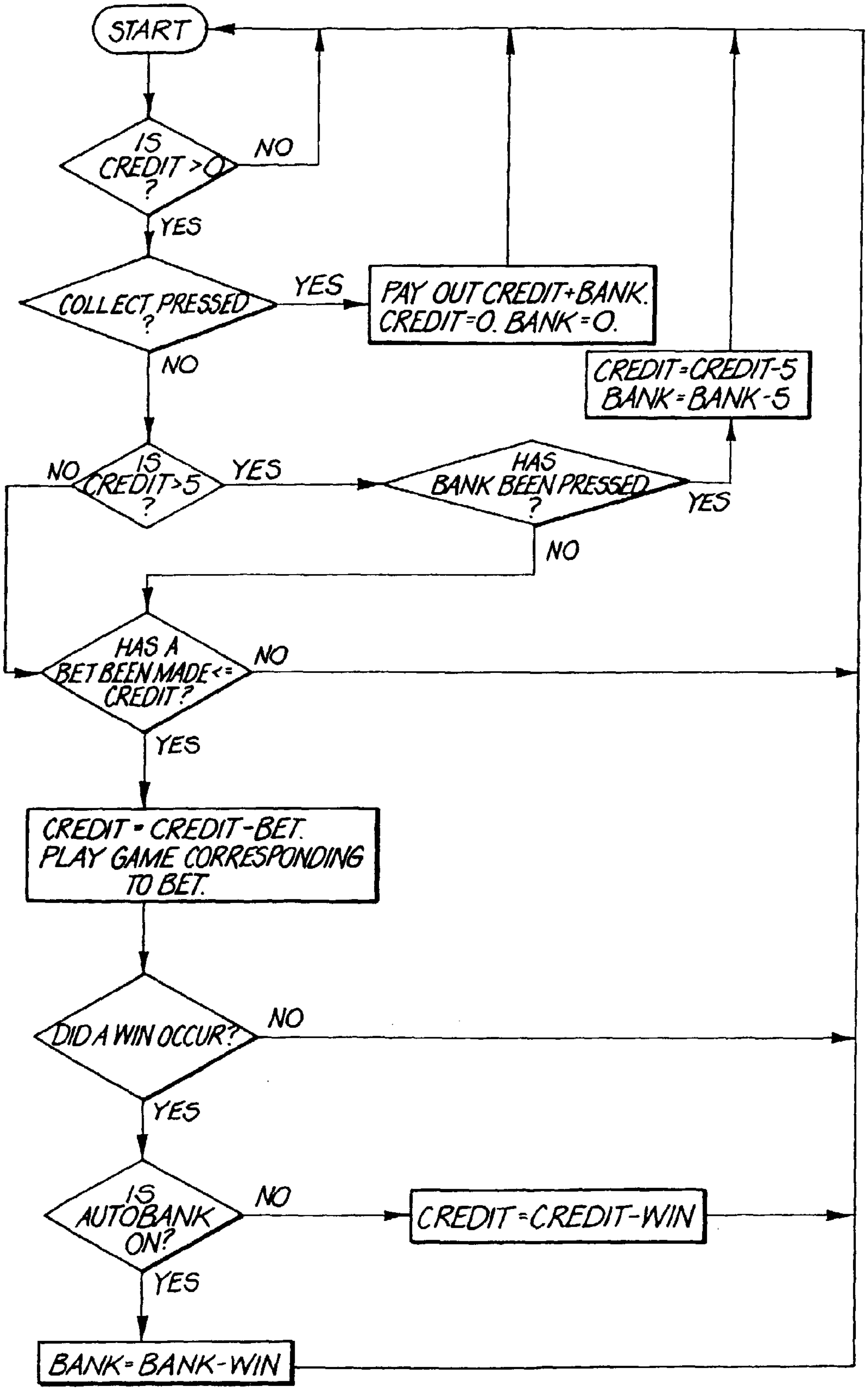
FIG. 4 shows a flow chart of one embodiment of a game sequence of the gaming machine.
Figure 5:
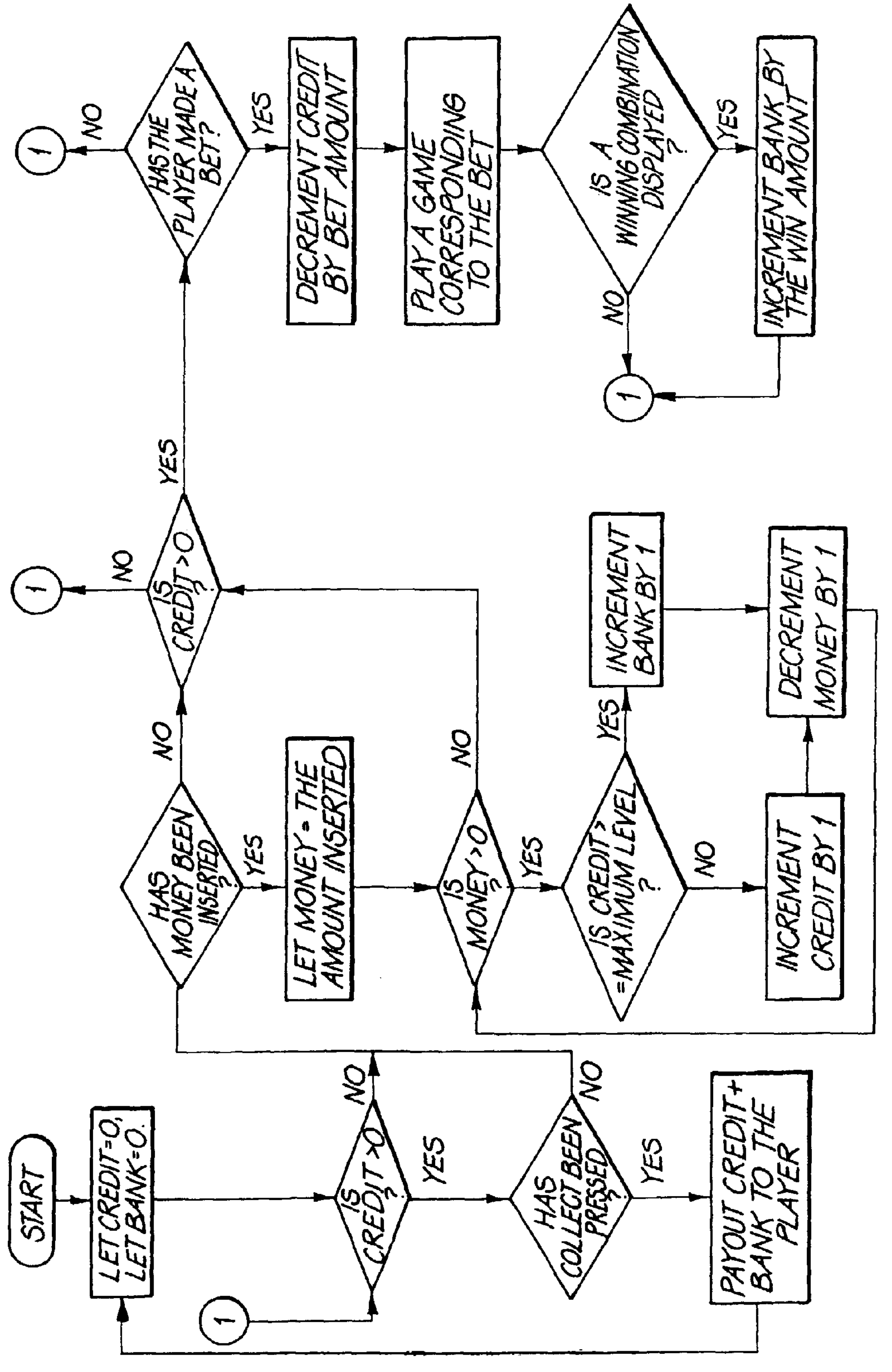
FIG. 5 shows a flow chart of a second embodiment of a game sequence of the gaming machine.

For the following game, as shown in FIG. 3*f* of the drawings, the player bets two credits per line on each of the three paylines. This time, the player does not achieve any wins.

As the player only has one credit left and does not wish to insert more credits, the player reduces the bet to one credit per line on the first payline. Also, as the player wishes to continue playing, the player toggles the button 48 so that the autobank feature is off as shown by the message 52 in FIG. 3*g* of the drawings.

As a result of three kings appearing on payline one, the player wins twenty credits. As the autobank feature is now off, these wins are credited to the credit meter 42.1. It is to be noted that, only as payline one was active, the four eights appearing on payline two do not pay any prize.

The player then decides that he or she only wishes to have five dollars to gamble with and wishes to bank the remaining fifteen dollars. The bank button 44 is pressed until only a credit of five dollars remains as shown on the credit meter 42.1 in FIG. 3*h* of the drawings.

The player then makes a bet of one credit per line on each of the three paylines but does not win anything. After this, the player decides to collect the money and presses the Collect button on the gaming machine 10. The two credits remaining on the credit meter 42.1 are paid out together with the one hundred and fifty five credits on the bank meter 42.2.

Hence, it is an advantage of the invention that a feature is added to the gaming machine which, the applicant believes, will encourage responsible gaming.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A gaming machine, comprising:

a game controller configured to control play of a game in a playing session comprising a plurality of game plays in which a player wagers credits;

a display configured to display images of the game, the display being controlled by the game controller;

a first credit meter that, under the control of the game controller, keeps an account of unwagered credits which are available to be wagered by the player during the playing session;

a bank credit meter that, under the control of the game controller, keeps an account of banked credits which the game controller is configured to prevent the player from wagering in any game play of the playing session, and which the game controller is configured to cause the gaming machine to return to the player only after the termination of the playing session; and a bank button configured to cause the game controller to transfer a number of unwagered credits from the first credit meter to the bank credit meter each time the bank button is actuated during the playing session.

2. The gaming machine of claim 1, wherein prior to the gaming session, the game controller is configured to add a first portion of tendered credits to the first credit meter and a second portion of the tendered credits to the bank credit meter in response to the player indicating only a part of the tendered credits is to be used for wagering by the player.

3. The gaming machine of claim 1, wherein the game controller is configured to automatically transfer credits beyond a predetermined threshold to the bank credit meter without player intervention.

4. The gaming machine of claim 1, wherein the game controller is configured to credit wins from games played to the bank credit meter instead of the first credit meter.

5. The gaming machine of claim 4, wherein the game controller is configured to credit wins to the bank credit meter at the option of the player.

6. The gaming machine of claim 4, wherein the game controller is configured to permit the player to set a limit above which the game controller credits wins to the bank credit meter and below which the game controller credits wins to the first credit meter.

7. The gaming machine of claim 6, further comprising a setting device operable by the player to set the limit.

8. The gaming machine of claim 1, further comprising a discernible warning device to warn a player, upon termination of a gaming session, to cash out from the bank credit meter.

9. The gaming machine of claim 8, wherein the game controller is configured to prevent the player from canceling the discernible warning device by entering more credit into the gaming machine.

10. The gaming machine of claim 1, wherein the gaming controller is configured to permit credits to be added to the bank credit meter during the playing session, but prevents credits from being removed from the bank credit meter during the playing session.

11. The gaming machine of claim 1, wherein the game controller is configured to prevent the player from adding credits to the gaming machine after the playing session is initiated, and to continue to prevent the player from adding credits to the gaming machine until termination of the playing session and collection of banked credits from the bank credit meter.

12. The gaming machine of claim 1, wherein the number of unwagered credits transferred upon each actuation of the bank button is predetermined.

13. The gaming machine of claim 1, wherein the game controller permits the player to specify the number of unwagered credits transferred upon each actuation of the bank button.

14. A gaming machine, comprising:

a display;

a game control arrangement configured to control images displayed on the display, the game control arrangement configured to play a game in a playing session comprising a plurality of game plays in each of which one or more random events are caused to be displayed on the display; and a credit meter to which the game control arrangement credits a prize if a predetermined winning event results from the one or more random events;

wherein the game control arrangement is configured to cause the gaming machine to distribute any credits credited to the credit meter if the playing session is terminated;

wherein the credit meter includes:

an available credit meter displayed on the display and configured to indicate credit which is available for expenditure in the gaming machine to play at least one game in the playing session; and a bank credit meter, displayed on the display together with the available credit meter;

wherein the game control arrangement is configured to prevent the player from wagering banked credit on any game in the gaming session, and to cause the gaming machine to distribute the bank credits to the player only following termination of the playing session;

wherein the game control arrangement is configured to automatically credit at least a portion of the prize to the bank credit meter if an autobank mode is active; and wherein the game control arrangement configured to require the player to collect banked credit on the bank credit meter at the termination of the playing session before permitting the gaming machine to accept more credit.

15. The gaming machine of claim 14, wherein the gaming controller is configured to permit credits to be added to the bank credit meter during the playing session, but prevents credits from being removed from the bank credit meter during the playing session.

16. The gaming machine of claim 14, wherein the game control arrangement is configured to permit the player to specify a limit, to credit all of the prize to the bank credit meter if the autobank mode is active and the prize exceeds the limit, and to otherwise credit all of the prize to the available credit meter.

17. The gaming machine of claim 14, further comprising an autobank button configured to, in response to being actuated, activate the autobank mode if inactive and inactivate the autobank mode if active.

18. A method implemented by a gaming device, the method comprising:

generating one or more random events;

awarding, if a predetermined winning event results from the one or more random events, a prize of credits to a credit meter of the gaming device, permitting expenditure of said credits on the credit meter to play at least one game in a playing session;

transferring a number of credits from the credit meter to a bank credit meter of the gaming device in response to a bank button of the gaming device being actuated;

preventing wagering of banked credit on the bank credit meter until distributed from the gaming machine following termination of the playing session;

distributing to the player at the gaming device or a player account, upon termination of the playing session, any banked credits credited to the bank credit meter; and requiring banked credit on the bank credit meter to be collected by the player at the termination of the playing session before permitting the gaming device to accept more credit.

19. The method of claim 18, further comprising:

permitting credits to be added to the bank credit meter during the playing session; and preventing credits from being removed from the bank credit meter during the playing session.

20. The method of claim 18, further comprising automatically transferring at least a portion of the prize of credits to the bank credit meter in response to an autobank mode being active.

* * * * *